United States Patent
Specht

(10) Patent No.: US 6,485,052 B2
(45) Date of Patent: Nov. 26, 2002

(54) DEVICE FOR INFLATING AN AIRBAG

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/827,242

(22) Filed: Apr. 4, 2001

(65) Prior Publication Data

US 2002/0008373 A1 Jan. 24, 2002

(30) Foreign Application Priority Data

Jun. 30, 2000 (DE) .......................... 100 31 865

(51) Int. Cl.[7] .............................................. B60R 21/26
(52) U.S. Cl. .................... 280/736; 280/740; 285/382
(58) Field of Search ............................ 280/730.2, 736, 280/737, 740, 741, 742; 285/382, 91

(56) References Cited

U.S. PATENT DOCUMENTS

| | | | | |
|---|---|---|---|---|
| 2,270,926 A | * | 1/1942 | Briegel et al. | 285/382 |
| 2,284,365 A | * | 5/1942 | Briegel | 285/382 |
| 3,113,792 A | | 12/1963 | Brown | |
| 3,731,948 A | * | 5/1973 | Risko | 280/737 |
| 3,777,772 A | | 12/1973 | Arnold et al. | |
| 3,868,124 A | * | 2/1975 | Johnson | 280/737 |
| 4,021,058 A | | 5/1977 | Suzuki et al. | |
| 4,111,470 A | * | 9/1978 | Welcker | 285/382 |
| 4,516,278 A | | 5/1985 | Lamond | |
| RE33,938 E | * | 5/1992 | Cuevas | 280/731 |
| 5,445,411 A | | 8/1995 | Kamiyama et al. | |
| 5,716,072 A | * | 2/1998 | O'Driscoll | 280/740 |
| 6,070,903 A | * | 6/2000 | Beisswenger et al. | 280/736 |
| 6,073,961 A | * | 6/2000 | Bailey et al. | 280/730.2 |
| 6,109,647 A | * | 8/2000 | Akaba et al. | 280/733 |
| 6,142,511 A | * | 11/2000 | Lewis | 280/737 |

FOREIGN PATENT DOCUMENTS

| | | |
|---|---|---|
| DE | 19629541 | 1/1998 |
| DE | 19738741 | 3/1999 |
| DE | 29823008 | 4/1999 |
| DE | 19856382 | 6/2000 |
| EP | 1080999 | 3/2001 |

* cited by examiner

Primary Examiner—Peter C. English
(74) Attorney, Agent, or Firm—Jarett Rieger

(57) ABSTRACT

A device for inflating an airbag has a gas generator. A gas generator housing can be anchored to a vehicle body. An end of an inflation tube is connected to a gas discharge socket fastened to the gas generator housing in an axially aligned and gas-tight manner. The tube end and the gas discharge socket are connected via a covering sleeve that bridges a gas-tight connection between the inflation tube and the gas generator.

3 Claims, 10 Drawing Sheets

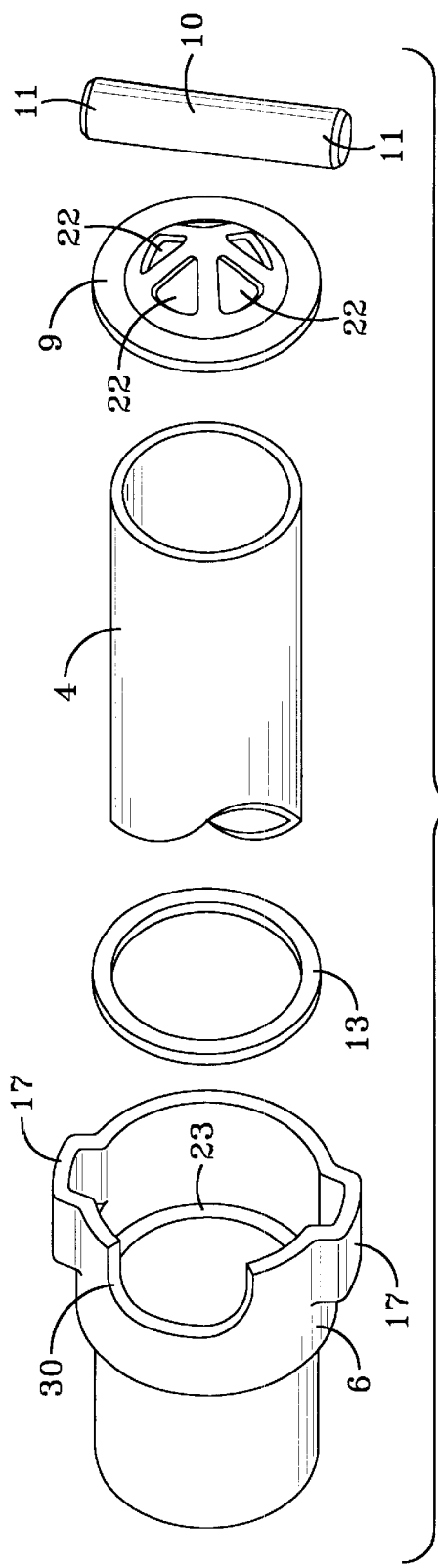
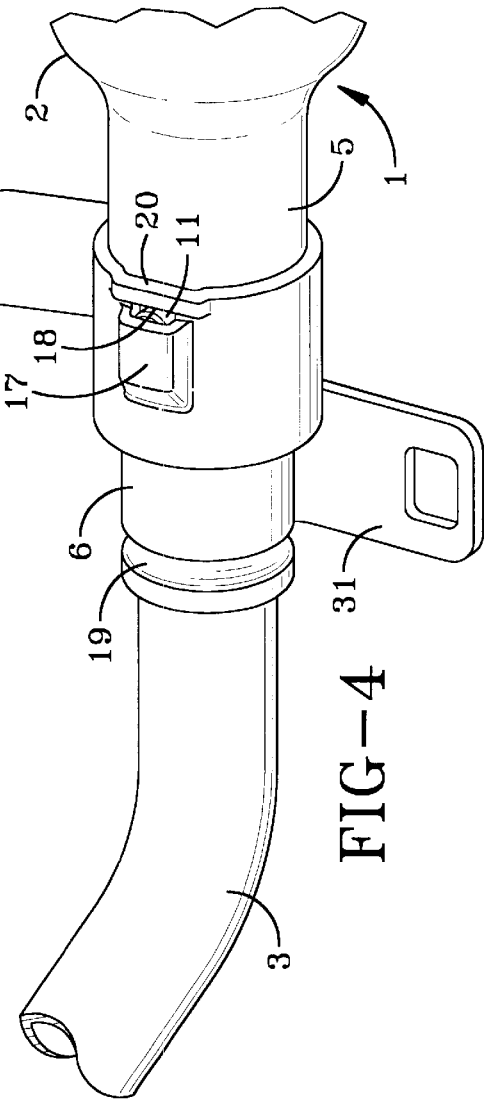
FIG-3
FIG-4

DEVICE FOR INFLATING AN AIRBAG

FIELD OF THE INVENTION

The present invention relates to a device for inflating an airbag with a gas generator.

DISCUSSION OF THE PRIOR ART

DE 197 38 741 A1 teaches a device for inflating a side curtain airbag in a vehicle. The folded airbag and the inflation tube are mounted along the roof edge in the vehicle. It is necessary that the inflation tube is adapted to the path of the roof edge or the upper roof crossbeam. As a result of these installation requirements, the path of the inflation tube deviates from alignment with the gas discharge socket. When the airbag is deployed the forces of inflation gas act on the connection between the inflation tube and the gas discharge socket. There is a risk that the gas-tight connection between the inflation tube and the gas discharge socket will be damaged and therefore inflation of the airbag within the required time is not achieved.

SUMMARY OF THE INVENTION

There is provided in accordance with the invention a device for inflating an airbag comprising a gas generator having a gas generator housing that can be anchored to a vehicle body and an inflation tube. An end of the inflation tube is connected in an axially aligned and gas-tight manner to a gas discharge socket fastened to the gas generator housing. The tube end is fixed by a covering sleeve that at least partially surrounds an outer face of the tube end or directly on the gas discharge socket so as to be secured in an axial direction and secured against rotation around an axis of the tube.

BRIEF DESCRIPTION OF THE DRAWINGS

FIG. 3 is an exploded view of the first embodiment of the invention.

FIG. 4 is a perspective view of the first embodiment.

DETAILED DESCRIPTION OF THE INVENTION

Figure 1:
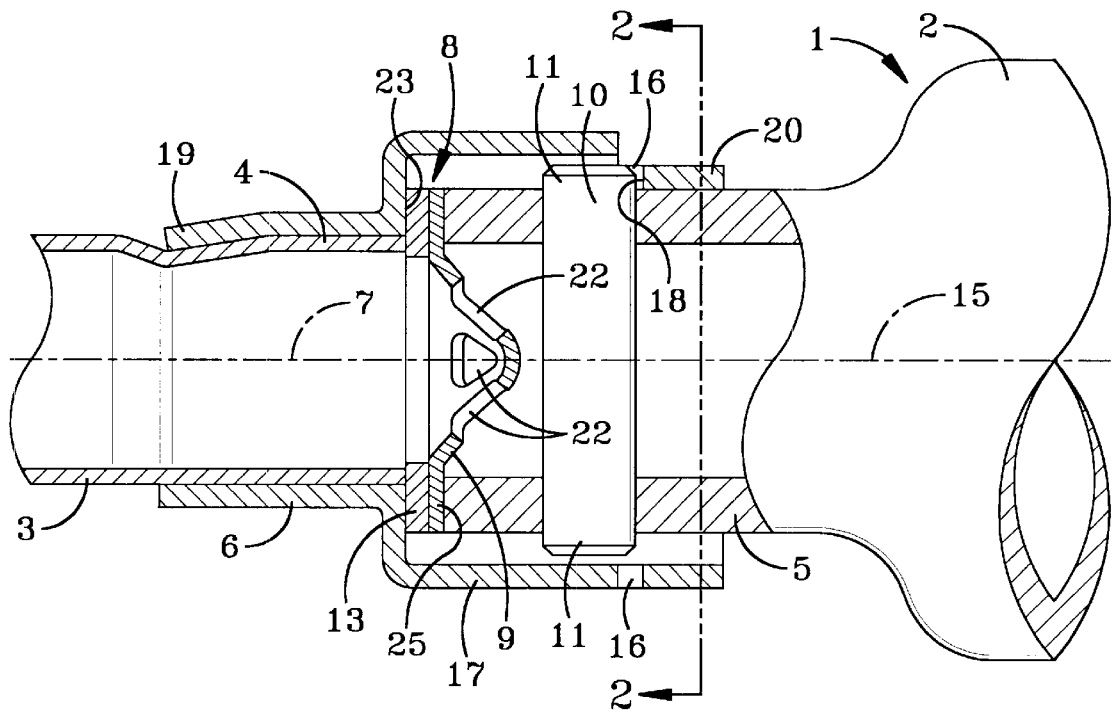
FIG. 1 is a fragmentary view, partially broken away of a first embodiment of the invention.

The embodiments shown in the figures of a device for inflating an airbag have a gas generator 1, the housing 2 of which can be anchored to a vehicle body, for example in the C-column in known manner. The housing 2 and a gas discharge socket 5 that is rigidly connected to the housing, for example, by welding and other suitable ways, are load bearing or load absorbing structural parts via which forces can be guided into the vehicle body on which the gas generator housing is fastened.

A gas-tight connection is achieved between the inflation tube 3 and the gas generator 1 that remains tight even when an airbag is being inflated. This allows provision of a space-saving arrangement of the gas generator substantially in alignment with the inflation tube part adjacent to the gas generator in the vehicle. The transfer of gas from the gas discharge socket 5 into the end of the inflation tube is further achieved without diverting the gas, and therefore smoothly; the cavity surrounded by the gas discharge socket and the cavity surrounded by the inflation tube end are axially aligned with one another.

The gas discharge socket 5 is connected to the inflation tube 3 via a gas-tight connection 8. The inflation tube has a tube end 4. Between the inflation tube 3 and the gas discharge socket 5, a gas-tight connection 8 is arranged on the end face. In the embodiments shown in FIGS. 1 to 5, the gas-tight connection 8 comprises an elastic ring seal 13. In the embodiments in FIGS. 6 to 12, the gas-tight connection comprises a peripheral weld 14, 26. In the embodiments shown in FIGS. 5 to 12, the end face of the tube end 4 or a covering sleeve 6 is widened and has a peripheral flange 21, 27. This forms a widened connecting face on its end face for the gas-tight connection 8, for example the elastic ring seal 13 or the peripheral weld 14, 26.

Extending over the cross-section of the gas discharge socket 5 is a trap 9 that has gas discharge apertures 22 therethrough. Parts that detach from the gas generator when the inflation gas is released are captured by this trap. The trap 9 is conical in design with the cone point being directed counter to the discharge direction. A bolt 10 extends transversely through the gas discharge socket 5. The closing membrane of the gas generator 1, not shown in detail, can be supported on this bolt 10 via an intermediate part, not shown in detail, so that a secure closure of the inflation gas in the gas generator housing 2 is ensured.

To obtain a gas-tight connection 8 a covering sleeve 6 is provided in each embodiment. The covering sleeve is at least partially rigidly connected with interlocking fit to the outer face of the tube end 4 and to the gas discharge socket 5.

Figure 2:
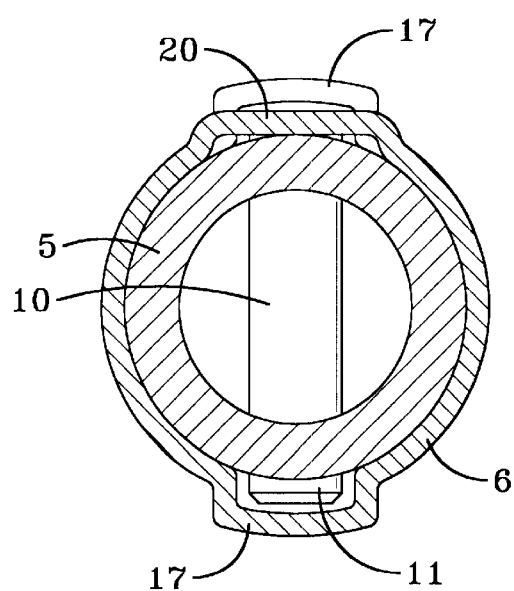
FIG. 2 is a cross-section along section line 2—2 in FIG. 1.
Figure 5:
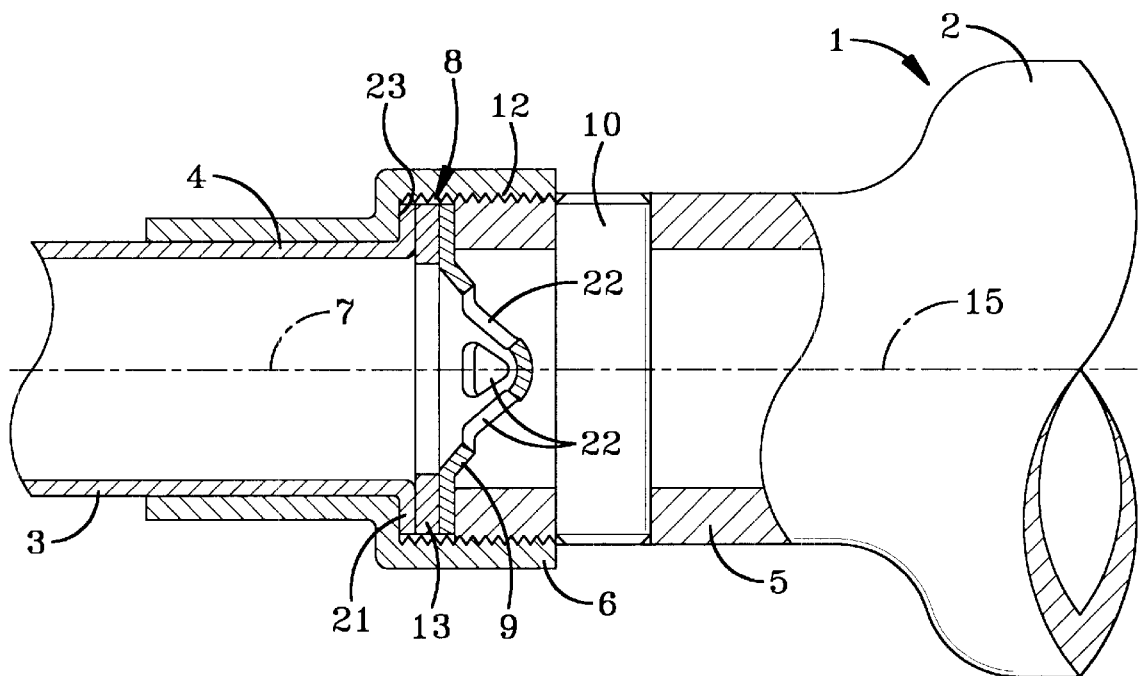
FIGS. 5–9 are fragmentary views, partially broken away of second through sixth embodiments of the invention.

In the embodiment shown in FIGS. 1 to 4, the bolt 10 is elongated and has ends 11 that project above the outer face of the gas discharge socket 5. Deformations in the form of pockets 17 are impressed into the covering sleeve 6 to receive the bolt ends. These deformations extend in an axial direction and correspond to the arrangement of the bolt ends 11 diametrically in the covering sleeve 6. The pocket-shaped deformations 17 are pushed over the bolt ends 11, whereby a fastening flange 25 of the trap 9 is arranged on the inside of the covering sleeve 6. Slots 16 or weak points are impressed into the pocket-shaped deformations 17. The slots or weak points are located in the region of the edge of the respective bolt end 11 when the covering sleeve 6 is pushed on. A pocket part 20 is located behind the respective slot 16 and is deformed against the outer face of the gas discharge socket 5. A stop face 18 is located remote from the front end or the front face end of the gas discharge socket 5 on which the connection to the tube end 4 or the inflation tube 3 is provided (FIG. 2).

As shown in FIGS. 2 and 4, two pocket-shaped deformations 17 surround the bolt ends 11 in the peripheral direction.

The other sleeve part of the covering sleeve 6 has a shape adapted to the outer face of the gas discharge socket 5, in particular a hollow cylindrical shape, and mates with an interlocking fit on the outer face of the gas discharge socket 5. This results in an anchoring of the covering sleeve 6 on the gas discharge socket 5, secured against rotation and secured in the axial direction.

The covering sleeve 6 is also connected with an interlocking fit to the outer face of the tube end 4. One or more impressions or flanges 19 are preferably located on the periphery, by virtue of which the inflation tube 3 is connected to the covering sleeve 6 non-rotatably and secured in the axial direction.

The gas-tight connection 8 (preferably ring seal 13 between the end faces of the tube end 4 and the gas discharge socket 5 and an inner peripheral stop face 23 of the covering sleeve 6) is mechanically tensioned or biased by the covering sleeve. A gas-tight connection between the inflation tube 3 and the gas generator 1 is thus achieved.

As shown in FIG. 4, in the assembled state an ignition device 29 protrudes radially from the gas discharge socket 5 and is located in a recess 30 best shown in FIG. 3, of the covering sleeve 6 on which a fastening tongue 31 can be provided.

In this embodiment forces caused by the inflation gas during the inflation process are resiliently absorbed and substantially guided via the covering sleeve 6 into the gas discharge socket 5 that is rigidly anchored to the vehicle body. A resilient support or absorption of the forces emanating from the inflation tube 3 is also obtained in the embodiment shown in FIG. 5 in which the covering sleeve has an inner thread that is screwed on a thread 12 on the gas discharge socket 5. The gas-tight connection 8 formed by the ring seal 13 is pressed with its end face onto the gas discharge socket by the peripheral stop face 23. As already described, the tube end 4 with the peripheral flange 21 is arranged between the peripheral stop face 23 on the inside of the covering sleeve 6 and the ring seal 13. The trap 9 with its peripheral fastening flange 25 is inserted between the ring seal 13 and the end face of the gas discharge socket 5. This arrangement is also provided in the embodiment shown in FIGS. 1 to 4. Projecting bolt ends are not necessary in the embodiment in FIG. 5 because the covering sleeve 6 is rigidly connected to the gas discharge socket 5 via the thread engagement. As in the embodiment shown in FIG. 1, impressions or flanges 19 can be provided in the embodiment shown in FIG. 5, at the tube end 4 for a connection which is secured against rotation between the tube end and the covering sleeve.

Figure 6:
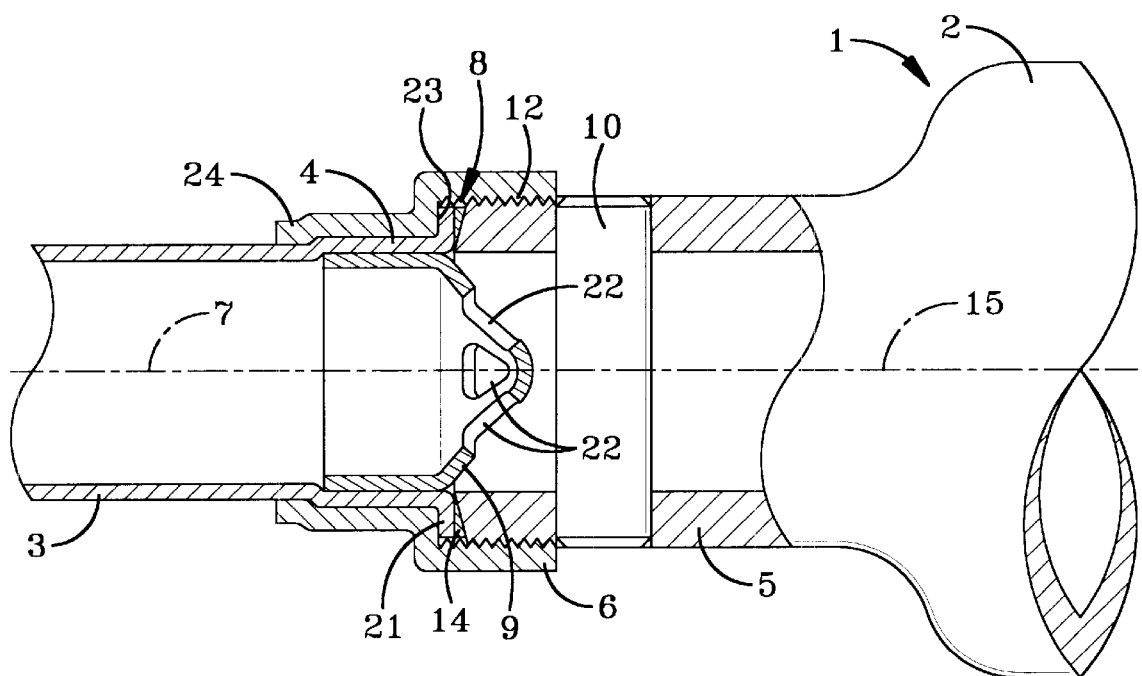

In the embodiment shown in FIG. 6, the gas-tight connection 8 is peripheral weld 14. On its end face, the tube end 4 can have the peripheral flange 21 which comprises the connecting face for the weld 14 to the end face of the gas discharge socket 5. The sleeve part of the covering sleeve 6 contacting the outer face of the tube end 4 can be rigidly connected to the outer side of the tube end 4 by a peripheral crimp or impression 24. The trap 9 can be supported in the region of the peripheral impression 24 on the inside of the tube end 4. The covering sleeve 6 has a peripheral inner stop face 23 with which the flange 21 on the end face of the tube end 4 is pressed against the weld 14. In the embodiment shown the covering sleeve is connected to the gas discharge socket 5 via the thread engagement as in the embodiment in FIG. 5. It is also possible to anchor the covering sleeve 6 to the gas discharge socket 5 as in the embodiment shown in FIGS. 1 to 4.

In the embodiments shown in FIGS. 7 to 12, the gas-tight connection 8 between the inflation tube 3 and the gas discharge socket 5 or the gas generator 1 is achieved by the covering sleeve 6 being welded to the gas discharge socket 5 by a peripheral weld joint 26. Preferably the covering sleeve 6 and the gas discharge socket 5 comprise the same material, for example V4A steel. Direct-current welding is preferably used here, in which a capacitor is briefly unloaded to supply the welding energy. In the shown embodiments, the end face of the covering sleeve 6, welded on the end face to the gas discharge socket 5, is widened to a peripheral flange 27. An annular peripheral weld 26 is thus obtained between the covering sleeve 6 and the gas discharge socket 5. This circumferential peripheral weld 26 provides a relatively large connecting face within the width of the ring between the gas discharge socket 5 and the covering sleeve 6. The covering sleeve 6 is supported on the gas discharge socket 5 in this face, as a result of which a reliable absorption of forces emanating from the inflation tube 3 is ensured.

Figure 7:
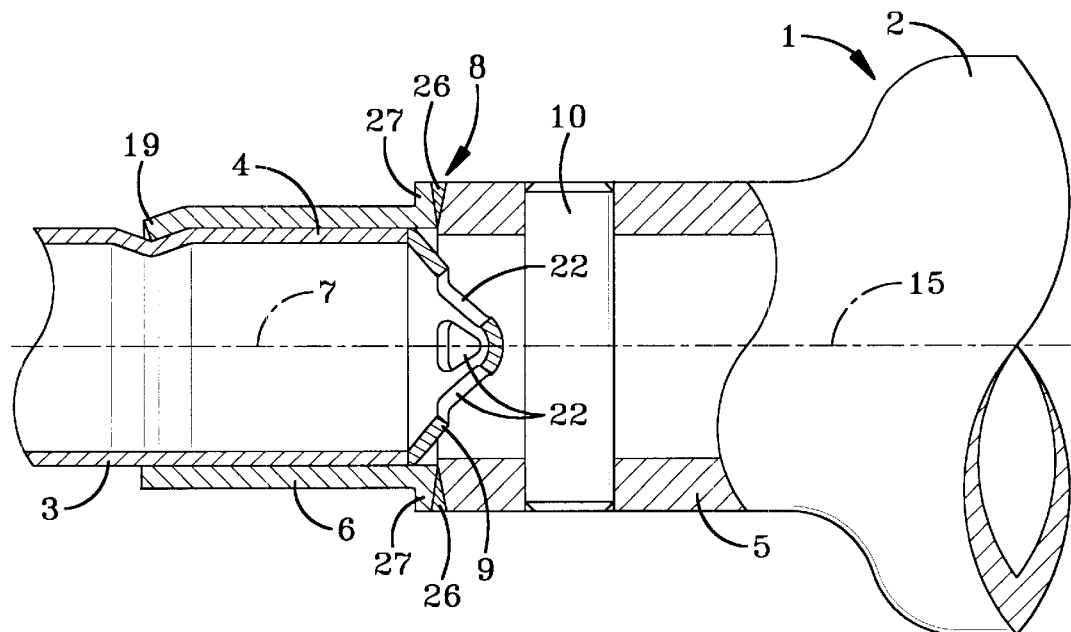
Figure 8:
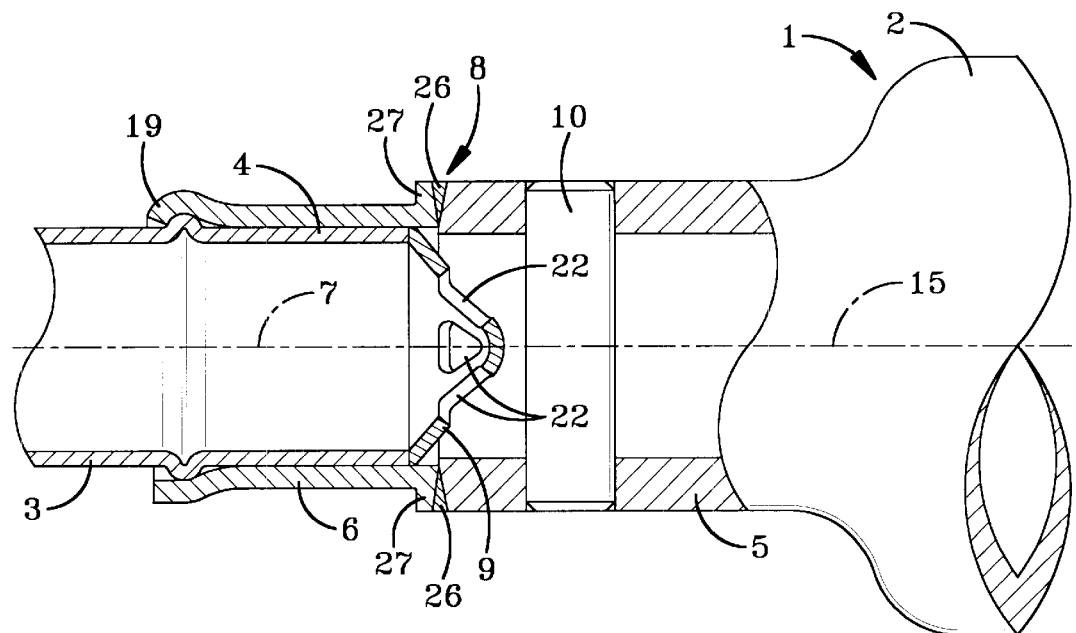

The covering sleeve 6 is connected with an interlocking or non-interlocking contact fit by impressions or a peripheral flange 19 to the inflation tube 3 in the embodiments in FIGS. 7 and 8. The covering sleeve 6 surrounds the tube end 4, as in the embodiments described above. The covering sleeve 6 also contacts the outside of the tube end 4 with an interlocking fit in the region of the tube end 4. In the embodiment in FIG. 7 the peripheral flange 19 is impressed into a recess in the inflation tube 3. In the embodiment shown in FIG. 8, the inflation tube 3 has a peripheral widening around which the flange 19 is put.

Figure 9:
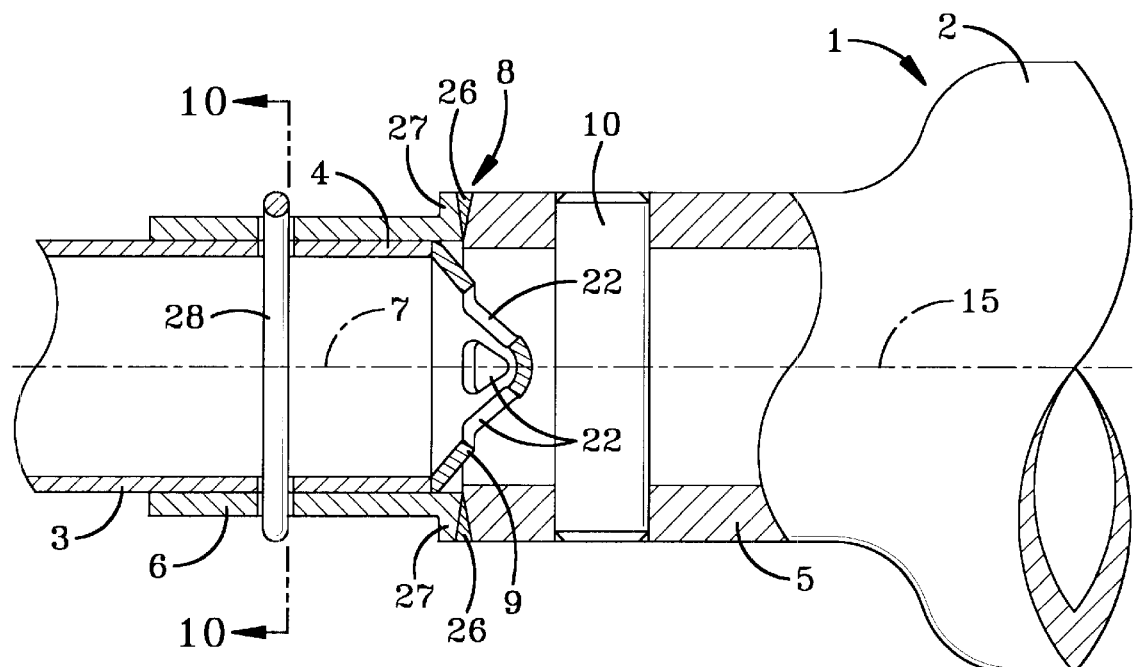
Figure 10:
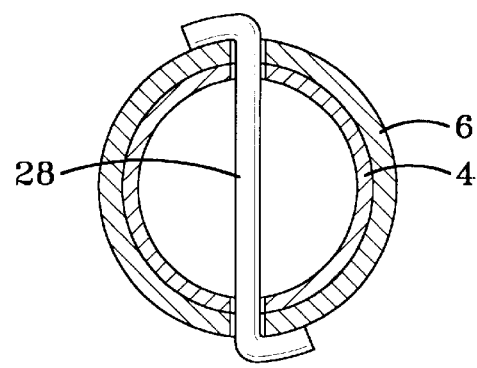
FIG. 10 is a cross-section along section line 10—10 in FIG. 9.
Figure 11:
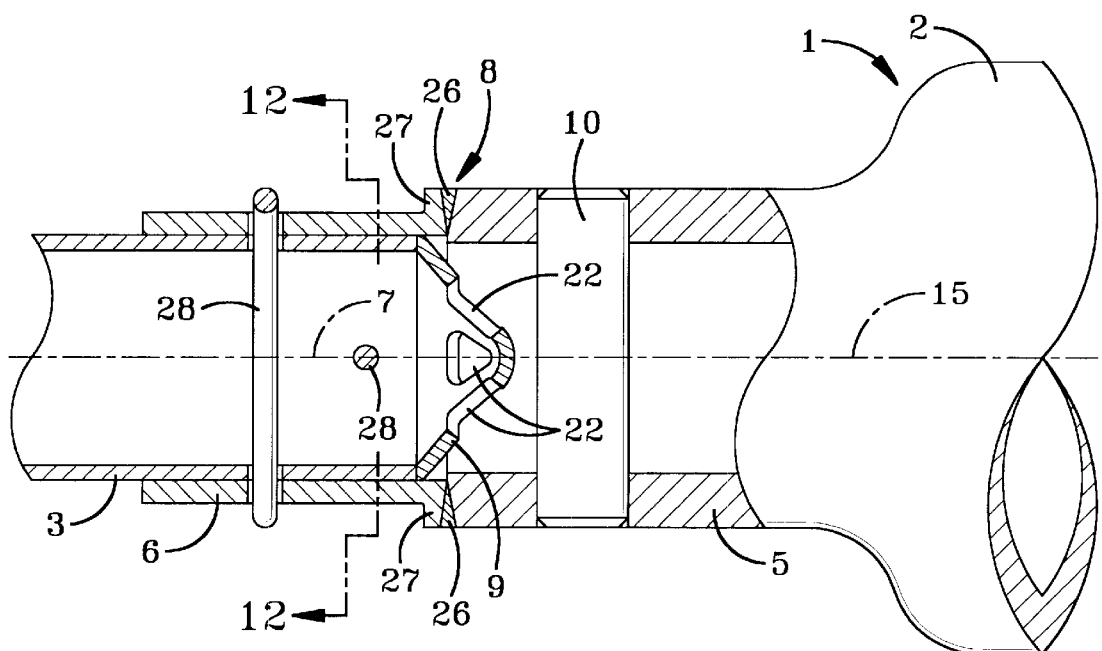
FIG. 11 is a fragmentary view, partially broken away of a seventh embodiment of the invention.
Figure 12:
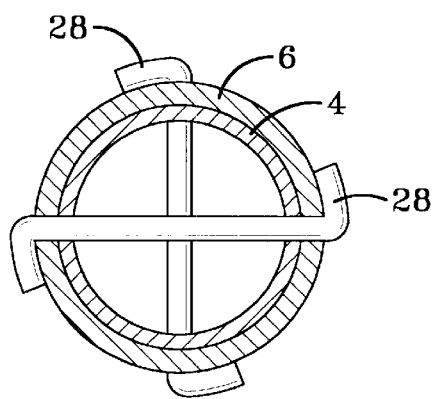
FIG. 12 is a cross-section along section line 12—12 in FIG. 11.

In the embodiment in FIG. 9, the inflation tube 3 and the covering sleeve 6 are secured in the region of the tube end 4 against rotation and secured in the axial direction by a fixing element 28. The fixing element 28, which may be a nail, pin, wire or similar, projects transversely to the axial direction through the tube end 4 and the covering sleeve 6. Aligned apertures in the tube end 4 and the covering sleeve are provided for this purpose. Projecting ends of the fixing element 28 can be folded round, as seen in FIG. 10, and rest on the outer face of the covering sleeve 6. In the embodiment shown in FIG. 11, two fixing elements 28 are provided in crossed arrangement (FIG. 12). In this crossed arrangement, the fixing elements 28 can have the function of the trap 9.

As shown in the figures, the trap 9 has a cone shape. The point of the cone is preferably directed counter to the discharge direction, as shown in the figures.

In the embodiments shown in FIGS. 7 to 12, the trap 9 is supported in the axial direction preferably on the inflation tube 3 or on the end face of the tube end 4 as shown in the figures. In the embodiments in FIGS. 7 to 12 the covering sleeve 6 surrounds the tube end 4 in a gas-tight manner. This gas-tight sheathing is also supported by the flange 19. Together with the peripheral weld 26, the covering sleeve 6 forms the gas-tight connection 8 between the inflation tube 3 and the gas discharge socket 5 or gas generator 1.

The embodiments in the drawings show that the axis 15 of the gas discharge socket 5 and the tube axis 7 align with one another. Direct guiding of the gas without diversion thereof is therefore achieved from the gas generator 1 into the inflation tube 3. Excessive loading of the gas-tight connection 8 between the gas discharge socket 5 and the inflation tube 3 is thus avoided due to the covering sleeve 6, so that the gas-tight connection is maintained during the inflation process.

In the embodiments shown in FIGS. 7 to 12 the covering sleeve 6 can be one piece with the gas discharge socket 5. It then forms a continuation or an extension of the gas discharge socket. In this embodiment, the inflation tube 3, at least in the region of its tube end 4, is designed in such a way that it is obturated by a pressure acting inside the tube against the inside wall of the extension of the gas discharge socket 5 by widening its internal diameter. This obturation by which the tube end is pressed against the inside wall of the gas discharge socket in a gas-tight manner, preferably takes place as a result of the pressure of the gas released from the gas generator 1.

Figure 13:
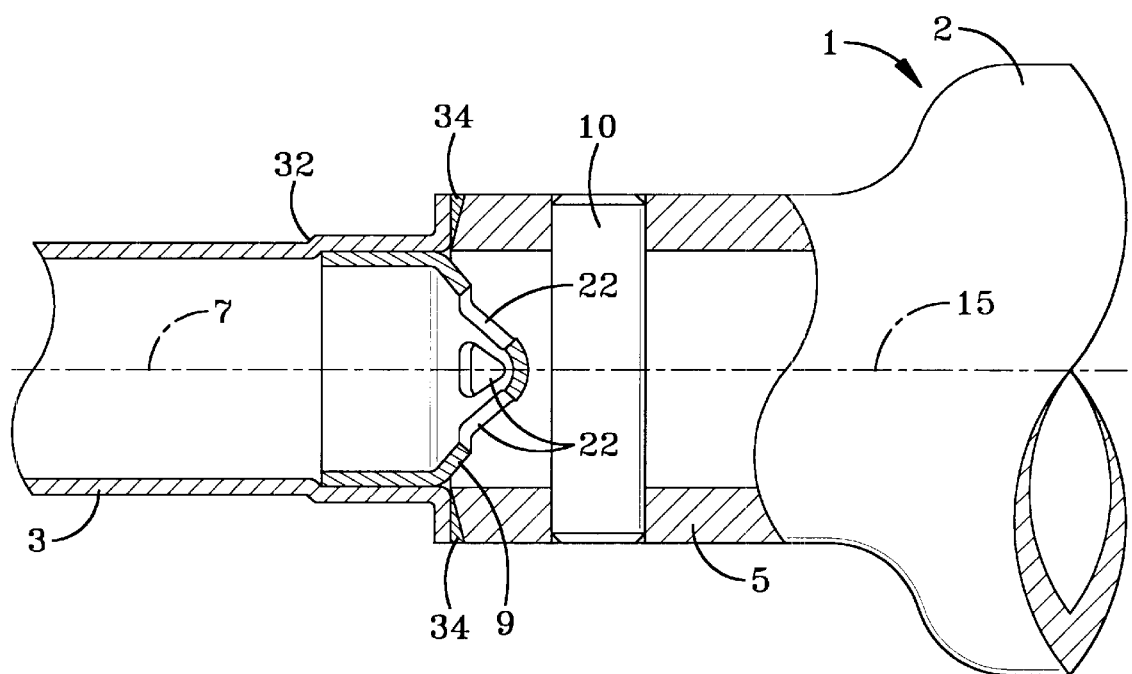
FIG. 13 is a fragmentary view, partially broken away of an eighth embodiment of the invention.

In the embodiment shown in FIG. 13, the inflation tube 3 is fastened to the gas discharge socket 5 directly with axial alignment at least in the region of the tube end. In the embodiment a peripheral weld 34, which can be designed in the same manner as the weld 26 in the embodiments in FIGS. 7 to 12, can be used for fastening.

The trap 9 is supported in this embodiment on the inside of the inflation tube 3. For this purpose the inflation tube 3 can have a tube restriction 32.

Figure 14:
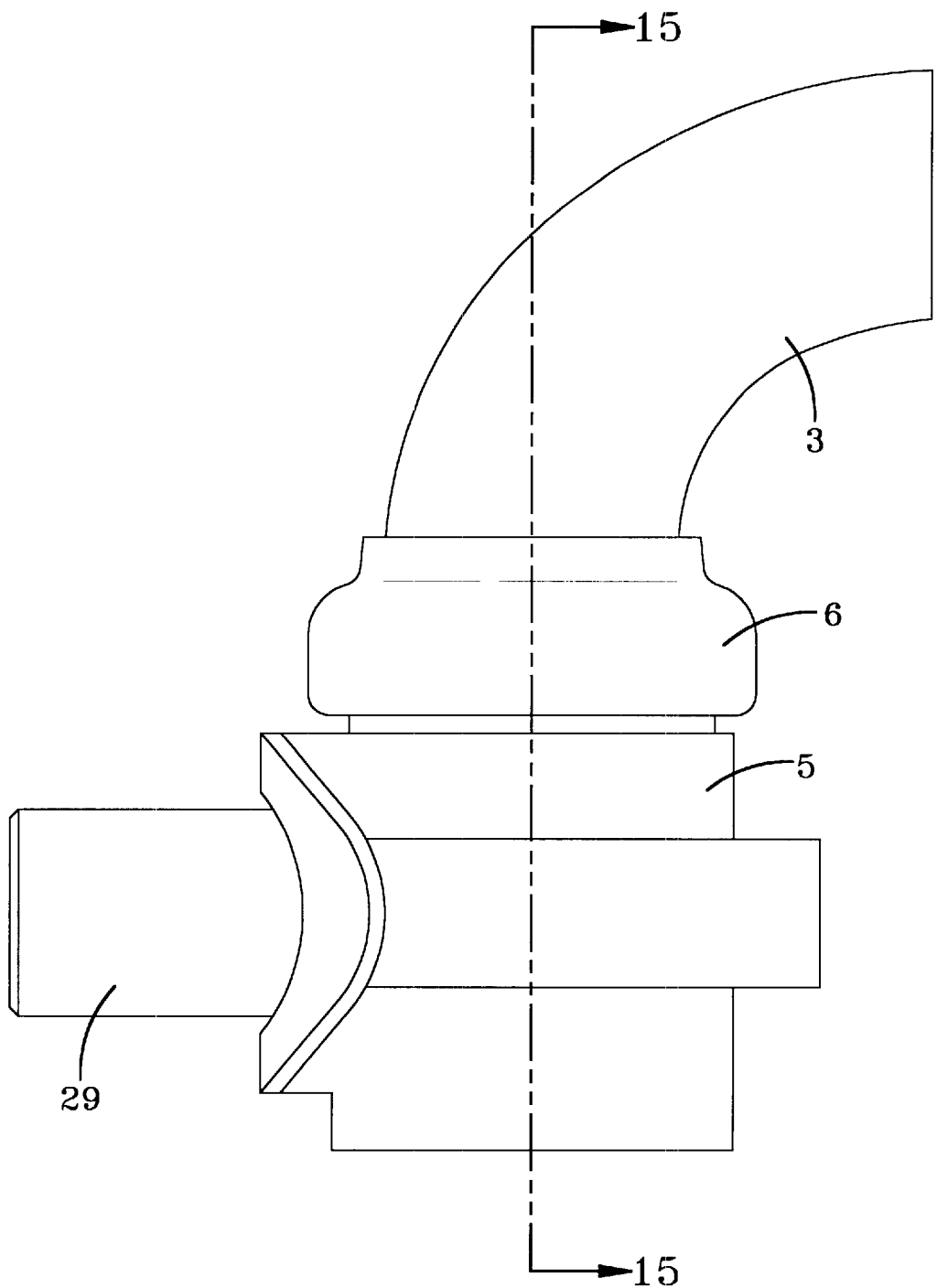
FIG. 14 is a side elevation view of a ninth embodiment of the invention.
Figure 15:
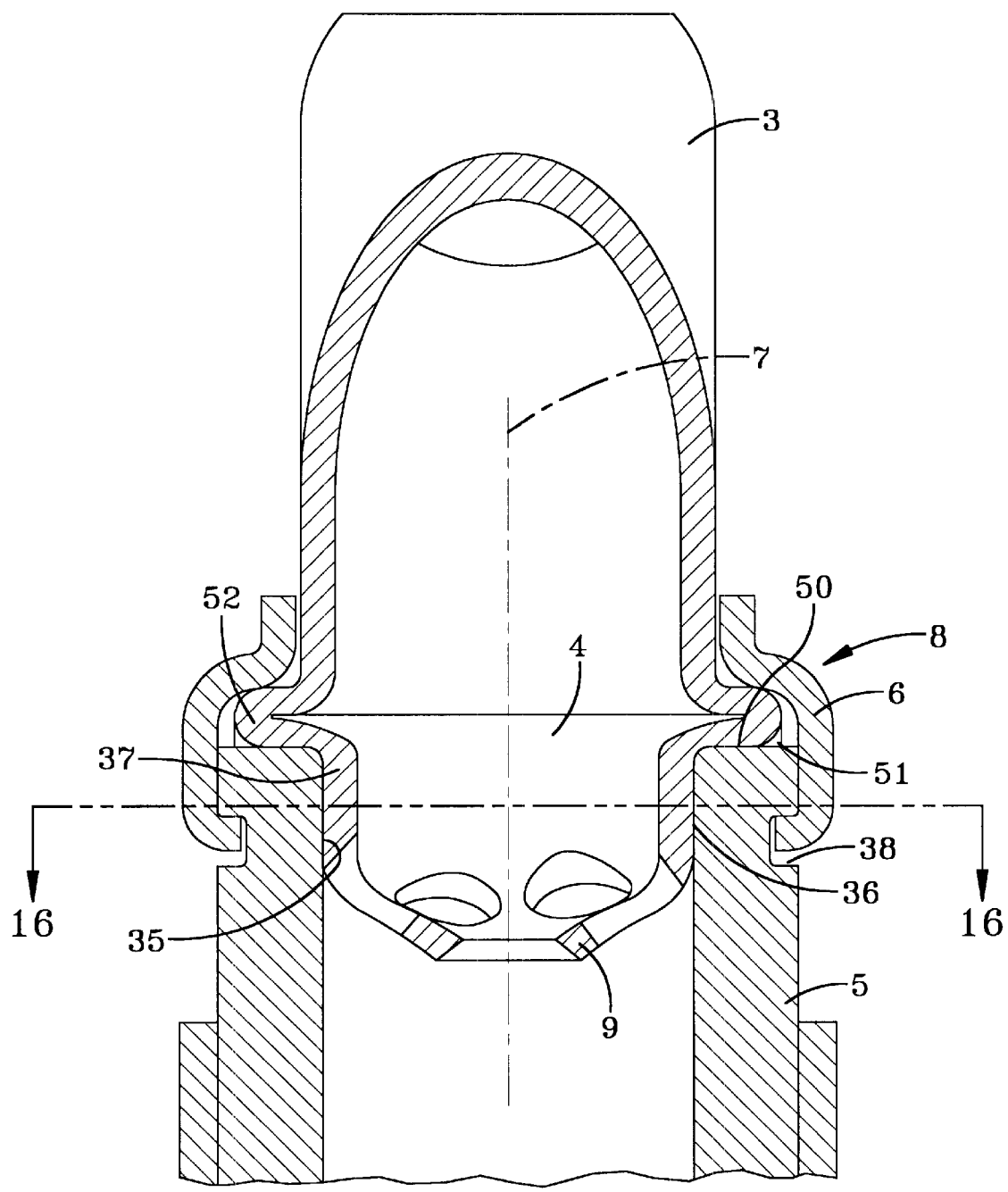
FIG. 15 is a cross-section along section line 15—15 in FIG. 14.
Figure 16:
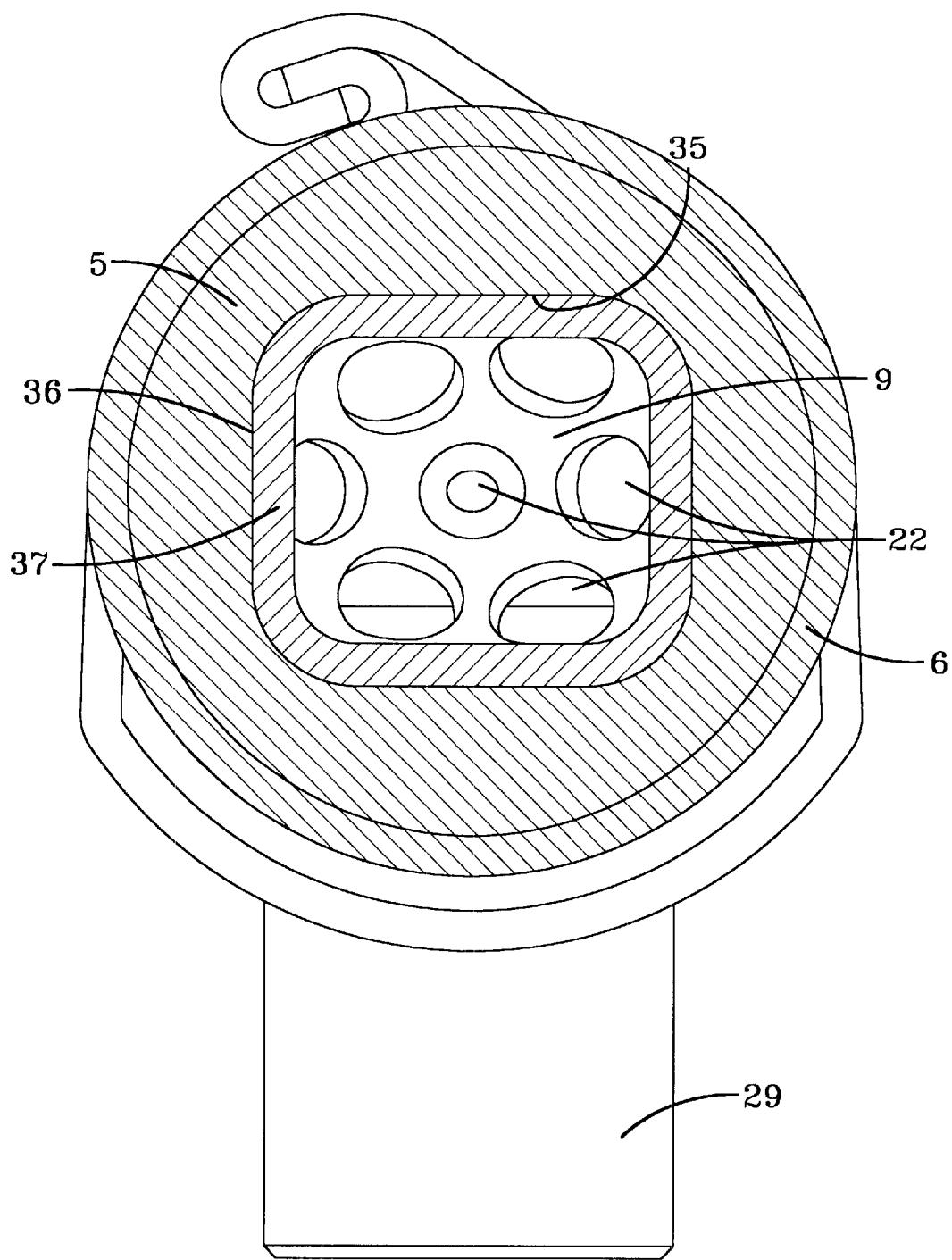
FIG. 16 is a cross-section along section line 16—16 in FIG. 15.

In the embodiment illustrated in FIGS. 14 to 16 a tube piece 37 of tube end 4 is inserted into the gas discharge socket such that it is secured against rotation. This inability to rotate around the tube axis 7 arises because an outer surface 36 of tube piece 37 inserted in the gas discharge socket 5 and the inner surface 35 of the gas discharge socket 5 lying against it have a shape which deviates from a circular cylindrical shape. The cross section of the internal space of the gas discharge socket 5 contained by the inner surface 35 is essentially rectangular, in particular square. The outer surface 36 of the tube piece 37 conforms also to this cross section, as can be seen in FIG. 16.

In the illustrated embodiment, the trap 9, which serves to restrain the parts detached on opening of the gas generator, is formed integrally on the tube end 4. The tube end 4 has a peripheral widening in the form of a flange 52. This widening can be formed by deformation of the tube wall of the tube end 4. The widening 52 is placed upon the end face 50 of the gas discharge socket 5 and is connected to it in a gas-tight manner. A peripheral weld 51, which connects in a gas-tight manner the widening 52 with the gas discharge socket 5, particularly in the region of the end face 50, is provided for this gas-tight connection. Furthermore, covering sleeve 6 can be provided for supporting and strengthening the gas-tight connection 8 of the tube end 4 with the gas discharge socket 5. The covering sleeve 6 surrounds the widening 52 as well as the end of the gas discharge socket 5 in the region of the end face 50. The covering sleeve 6 exerts an axial pressure on the connection between the peripheral widening 52 and the end face 50 and is supported in a peripheral groove 38 formed in the outer surface of the gas discharge socket 5 and held against the peripheral widening 52 of the tube end 4.

Many changes and modifications in the above described embodiments of the invention can, of course, be carried out without departing from the scope thereof. Accordingly that scope is intended to be limited only by the scope of the appended claims.

I claim:

1. A device for inflating an airbag comprising:
   a gas generator having a gas generator housing that can be anchored to a vehicle body;
   a gas discharge socket fastened to the gas generator housing;
   an inflation tube having an end that is connected to and axially aligned with the gas discharge socket and forms a gas-tight seal with the gas discharge socket, wherein the tube end is fixed by a covering sleeve that at least partially surrounds an outer face of the tube end and at least partially surrounds an outer face of the gas discharge socket so as to be secured in an axial direction and secured against rotation around an axis of the tube;
   a bolt extending transversely through the gas discharge socket with at least one bolt end projecting above the outer face of the gas discharge socket and the covering sleeve at least partially surrounding the at least one bolt end with an interlocking fit; and
   a gas-permeable trap extending over the cross-section of the gas discharge socket.

2. The device for inflating an airbag according to claim 1 wherein a gas-tight connection is arranged between the tube end and the gas discharge socket.

3. The device for inflating an airbag according to claim 1 wherein the covering sleeve is fixed on the outer face of the gas discharge socket.

* * * * *